United States Patent [19]

Allen et al.

[11] Patent Number: 4,556,793
[45] Date of Patent: Dec. 3, 1985

[54] EPITHERMAL NEUTRON LIFETIME LOGGING

[75] Inventors: Linus S. Allen, Dallas; William R. Mills, Duncanville, both of Tex.

[73] Assignee: Mobil Oil Corporation, New York, N.Y.

[21] Appl. No.: 482,751

[22] Filed: Apr. 7, 1983

[51] Int. Cl.⁴ ............................................. G01T 3/00
[52] U.S. Cl. .................................. 250/267; 250/269; 250/390
[58] Field of Search ............ 250/267, 269, 390, 370 D, 250/370 C; 376/160

[56] References Cited

U.S. PATENT DOCUMENTS 2,680,201 6/1954 Scherbatskoy ...................... 250/267
3,102,198 8/1963 Bonner ........................... 250/380 X
4,005,290 1/1977 Allen .................................. 250/266
4,152,590 5/1979 Smith, Jr. et al. ................... 250/264
4,241,253 12/1980 Allen et al. .......................... 250/390

Primary Examiner—Alfred E. Smith
Assistant Examiner—Constantine Hannaher
Attorney, Agent, or Firm—A. J. McKillop; Michael G. Gilman; George W. Hager, Jr.

[57] ABSTRACT

A radioactive borehole logging tool employs an epithermal neutron detector having a neutron counter surrounded by an inner thermal neutron filter and an outer thermal neutron filter. Located between the inner and outer thermal neutron filters is a neutron moderating material for extending the lifetime of epithermal neutrons to enhance the counting rate of such epithermal neutrons by the neutron counter.

14 Claims, 2 Drawing Figures

EPITHERMAL NEUTRON LIFETIME LOGGING

BACKGROUND OF THE INVENTION

This invention relates to radioactivity well logging and more particularly to an improved method and system for carrying out epithermal neutron lifetime measurements in a time-dependent radioactivity borehole logging tool.

In neutron-neutron logging, a source of primary radiation irradiates the formations surrounding a borehole with neutrons. The resulting secondary radiation is measured by detectors axially spaced from the source within the borehole. Such secondary radiation includes epithermal neutrons, thermal neutrons, and thermal neutron capture gamma rays. U.S. Pat. No. 4,005,290 to Allen discloses a borehole logging tool, a neutron source, and epithermal and thermal neutron detectors. Both the epithermal and thermal neutron detectors are of the proportional counter type disclosed in U.S. Pat. No. 3,102,198 to Bonner and filled with helium-3 gas at superatmospheric pressure preferably in the order of about two to twenty atmospheres absolute. The epithermal neutron detectors are further surrounded with cadmium shielding to prevent thermal neutrons from reaching the active volume of the counters. At least two electrodes in electrically conductive contact with the helium-3 gas are connected with a voltage source to establish an electrostatic field for the collection of ionized gas particles produced in the zone of the helium-3 gas upon entry of epithermal neutrons from the surrounding formations. U.S. Pat. No. 4,241,253 further discloses a neutron moderating material located between the helium-3 filled neutron counter and a thermal neutron shield. The moderator slows down epithermal neutrons penetrating the thermal neutron shield to enable their counting by the neutron counter.

SUMMARY OF THE INVENTION

The present invention is directed to the measurement of the epithermal neutron lifetime characteristic of a subsurface formation surrounding a borehole. A borehole logging tool employs a pulsed neutron source for irradiating the subsurface formation with repetitive bursts of fast neutrons. The neutron radiation returning to the borehole is filtered to remove thermal neutrons. The remaining unfiltered portion of the returning radiation is moderated to extend the epithermal neutron lifetime. The moderated radiation is then filtered to remove any thermal neutrons created during the moderating of the returning radiation.

More particularly, a borehole logging system for measuring epithermal neutron lifetime of formations surrounding a borehole employs a pulsed neutron source and a neutron sensitive counter. An outer filtering material surrounds the neutron counter to absorb thermal neutrons and prevent them from penetrating the neutron counter. A moderating material is located between the neutron counter and the outer filtering material for optimizing the epithermal die-away measurement by extending the epithermal die-away rate while minimizing any thermal neutron effect on the epithermal die-away measurement due to the extended die-away rate. An inner filtering material is located between the neutron counter and the moderating material for absorbing any neutrons which may have reached thermal equilibrium during moderation, thereby permitting only epithermal neutrons to reach the neutron counter. The moderator may also significantly improve the epithermal neutron counting rate and thereby increase the statistical precision of measured epithermal neutron lifetimes.

DESCRIPTION OF THE PREFERRED EMBODIMENT

The present invention is directed to a new and improved epithermal neutron detector for use in radioactivity well logging.

Figure 1:
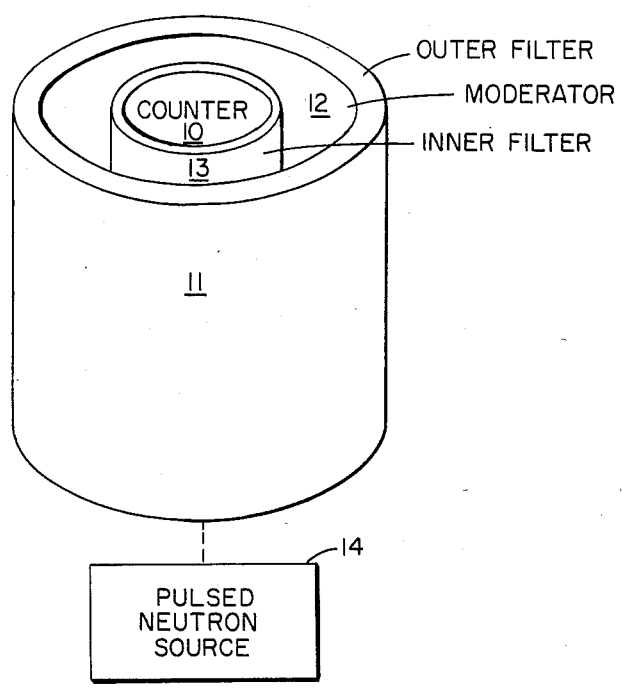
FIG. 1 illustrates the epithermal neutron detector of the present invention.

Referring to FIG. 1, a neutron sensitive counter 10, preferably a proportional counter filled with helium-3 gas, is surrounded by an outer thermal neutron filter 11, preferably a thin layer of cadmium or gadolinium. This filter prevents thermal neutrons which are in thermal equilibrium with their environment from entering the neutron detector. The energy corresponding to the most probable speed for thermal neutrons in equilibrium at a temperature of 20° C. is 0.025 electron volt. Epithermal neutrons are those neutrons which exhibit energies within the range from immediately above the thermal equilibrium region to about an energy of 100 electron volts. While the boundary between thermal and epithermal neutrons is, of necessity, somewhat arbitrary, it is normally placed in the range of 0.1 to 1.0 electron volt. Thus the outer neutron filter 11 allows only epithermal neutrons above about 0.1 to 0.1 electron volts to enter the space between the neutron counter 10 and the filter 11. The neutron counter 10 measures the rate of decay of the epithermal neutron populations passing through filter 11 as a qualitative indication of the amount of hydrogenous material present in the formation surrounding a borehole, which in turn may be indicative of the porosity of the formation.

Figure 2:
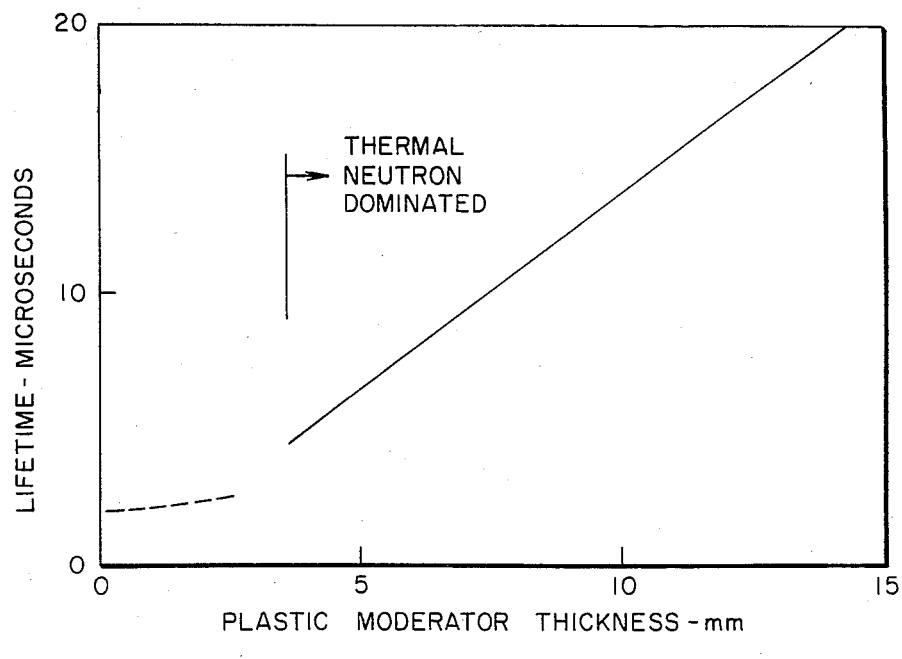
FIG. 2 illustrates the observed neutron lifetime as a function of moderator thickness for the epithermal neutron detector of FIG. 1.

In borehole logging operations involving the steady-state production of neutrons from the pulsed neutron source 14, it is usually possible to increase the efficiently of this epithermal neutron measurement by inserting an appropriate amount of neutron moderating material 12 between the neutron counter 10 and its thermal neutron filter 11. Although such use of a neutron moderation material works well in steady-state applications of borehole logging, as shown in the aforementioned U.S. Pat. No. 4,241,253, serious problems arise when there is an attempt to measure the lifetime of epithermal neutrons in time-dependent applications involving pulsed neutron sources. When enough moderating material 12 is used to produce a significant gain in neutron counting efficiency, or to lengthen the observed epithermal neutron lifetime to magnitudes which are more easily measured, the observed counting rate is almost completely dominated by thermal neutrons which have been moderated to equilibrium speeds by the moderating material within the detector. Such counting rates are controlled largely by the size and composition of the moderating material, and not by the physical properties of the formation. This is illustrated in FIG. 2 wherein two trends of neutron lifetimes are plotted for a 0.25 inch diameter, helium-3 counter moderated by acrylic plastic inside a 0.013 inch cadmium thermal neutron shield. The solid line shows the lifetime of thermal neutrons established within the acrylic plastic moderator. The dashed line shows the trend of epithermal neutron lifetimes. When the thickness of moderator 12 is zero, the epithermal neutron lifetime is stricly a function of the moderating properties of the formation medium surrounding the neutron counter. In one aspect of the present invention, epithermal lifetime can be increased significantly by surrounding the counter with only a few millimeters of moderator, such as acrylic plastic. However, it is not possible to produce large increases in the epithermal lifetime in this manner because for thicknesses exceeding about three millimeters the thermal neutron density within the thermal neutron filter begins to completely dominate the observed counting rate. This is due to the fact that for time-dependent measurements, a moderator thickness in excess of about three millimeters establishes a significant thermal neutron equilibrium distribution within the moderator and the epithermal neutron lifetime merges into the thermal neutron lifetime. Therefore, it is another aspect of the present invention to provide an additional or inner neutron filter 13 between the neutron counter 10 and moderator 12 which acts to prevent the thermal equilibrium neutrons from dominating the observed lifetimes measurement by excluding most of them from the neutron counter 10. This inner neutron filter 13 should preferably contain a 1/v absorber such as lithium-6 or boron-10, but could contain a non-1/v absorber such as gadolinium.

The foregoing described preferred embodiment permits enhanced epithermal neutron detection in radioactive borehole logging systems employing pulsed neutron sources which could not be achieved with steady state or continuous neutron sources. Other moderating and filtering materials than those described above in conjunction with the preferred embodiment may be successfully utilized as well as an infinite variety of combinations of materials. It is to be understood that the present invention relates to a method and system for optimizing epithermal neutron lifetime measurements for time-dependent borehole logging applications and modifications or alterations may be made without departing from the spirit and scope of the invention as set forth in the appended claims.

We claim:

1. A method for measuring the epithermal neutron lifetime characteristic of a subsurface formation surrounding a borehole, comprising the steps of:
   (a) irradiating the subsurface formation surrounding the borehole with repetitive bursts of fast neutrons, and
   (b) moderating the neutron radiation returning to the borehole between said repetitive bursts of fast neutrons to extend the epithermal neutron lifetime of said returning neutron radiation without merging said epithermal neutron lifetime into the thermal neutron lifetime of said returning neutron radiation.

2. A method for measuring the epithermal neutron die-away characteristics of a subsurface formation surrounding a borehole, comprising the steps of:
   (a) irradiating the subsurface formation surrounding the borehole with bursts of fast neutrons,
   (b) filtering the neutron radiation returning to the borehole in response to the irradiation of said formations to remove thermal neutrons, and
   (c) moderating the unfiltered portion of said returning radiation to extend the die-away time of epithermal neutrons.

3. The method of claim 2 further comprising the step of filtering said moderated portion of said returning radiation to remove any thermal equilibrium neutrons created during the moderating of said returning radiation.

4. A borehole logging system for measuring epithermal die-away of the formations surrounding the borehole, comprising:
   (a) a pulsed neutron source,
   (b) a neutron counter,
   (c) a filtering material surrounding said neutron counter for absorbing thermal neutrons to prevent them from penetrating said neutron counter, and
   (d) a moderating material located between said neutron counter and said filtering material for extending the epithermal neutron die-away rate while minimizing any thermal neutron equilibrium effect on said epithermal neutron die-away measurement due to the extended die-away rate.

5. The borehole logging system of claim 4 wherein said moderating material has a thickness which does not permit the establishment of a thermal neutron equilibrium within said moderating material.

6. The borehole logging system of claim 4 wherein said moderating material has a hydrogen atom density no greater than that of water.

7. The borehole logging system of claim 4 wherein said moderating material does not exceed three millimeters in thickness.

8. The borehole logging system of claim 4 wherein said moderating material is polyethylene.

9. The borehole logging system of claim 4 wherein said filtering material is cadmium.

10. The borehole logging system of claim 4 wherein said filtering material is gadolinium.

11. The borehole logging system of claim 4 further comprising a second filtering material located between said counter and said moderating material for absorbing any neutrons which have reached thermal equilibrium, thereby permitting only epithermal neutrons to reach said counter.

12. The borehole logging system of claim 11 wherein said second filtering material is lighium.

13. The borehole logging system of claim 11 wherein said second filtering material is boron.

14. The borehole logging system of claim 11 wherein said second filtering material is gadolinium.

* * * * *